US012748524B2

(12) United States Patent
Peng et al.

(10) Patent No.: US 12,748,524 B2
(45) Date of Patent: Sep. 29, 2026

(54) SCREENSHOT METHOD, ELECTRONIC DEVICE AND COMPUTER-READABLE STORAGE MEDIUM

(71) Applicant: GUANGDONG OPPO MOBILE TELECOMMUNICATIONS CORP., LTD., Dongguan (CN)

(72) Inventors: Ying Peng, Dongguan (CN); Yuyue Liu, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 375 days.

(21) Appl. No.: 18/243,917

(22) Filed: Sep. 8, 2023

(65) Prior Publication Data

US 2023/0418446 A1 Dec. 28, 2023

Related U.S. Application Data

(63) Continuation of application No. PCT/CN2022/079210, filed on Mar. 4, 2022.

(30) Foreign Application Priority Data

Mar. 10, 2021 (CN) ........................ 202110260714.6

(51) Int. Cl.
*G06F 3/04845* (2022.01)
*G06F 3/04842* (2022.01)
(Continued)

(52) U.S. Cl.
CPC ...... *G06F 3/04845* (2013.01); *G06F 3/04842* (2013.01); *G06F 3/0488* (2013.01);
(Continued)

(58) Field of Classification Search
CPC ............ G06F 3/04842; G06F 3/04845; G06F 3/0488; G06F 2203/04806; G06F 3/0485;
(Continued)

(56) References Cited

U.S. PATENT DOCUMENTS

2014/0331174 A1* 11/2014 Wen .................... G06F 3/04883
715/804
2015/0169096 A1* 6/2015 Nishizawa .............. G06F 3/017
345/173

(Continued)

FOREIGN PATENT DOCUMENTS

CN 105607792 A 5/2016
CN 109388304 A 2/2019

(Continued)

OTHER PUBLICATIONS

WIPO, International Search Report for PCT Application No. PCT/CN2022/079210, May 16, 2022.

(Continued)

*Primary Examiner* — Angie Badawi
(74) *Attorney, Agent, or Firm* — Sheppard, Mullin, Richter & Hampton LLP

(57) ABSTRACT

Provided are a screenshot method, an electronic device and a storage medium. In the method, in response to a screenshot operation, a screenshot of each of multiple display windows displayed on a screen is separately acquired as a first screenshot, to obtain first screenshots of the multiple display windows. At least one second screenshot, each being a screenshot of at least two display windows of the multiple of display windows, is acquired. The first screenshot and the at least one second screenshot are displayed in a preview mode. In response to a selection operation for a target screenshot of the screenshots displayed in the preview mode, the target screenshot is saved.

19 Claims, 9 Drawing Sheets

(51) Int. Cl.
*G06F 3/0488* (2022.01)
*G06T 11/60* (2026.01)

(52) U.S. Cl.
CPC .... *G06T 11/60* (2013.01); *G06F 2203/04806* (2013.01); *G06T 2200/24* (2013.01)

(58) Field of Classification Search
CPC ....... G06F 2203/04808; G06F 3/04883; G06F 3/0481; G06T 11/60; G06T 2200/24
See application file for complete search history.

(56) References Cited

U.S. PATENT DOCUMENTS

| | | | | |
|---|---|---|---|---|
| 2022/0317824 | A1* | 10/2022 | Lee | G06F 3/0481 |
| 2023/0022300 | A1* | 1/2023 | Jung | G06F 3/04842 |
| 2023/0130466 | A1* | 4/2023 | Chakkalackal | G06F 3/0482 715/736 |
| 2024/0305750 | A1* | 9/2024 | Son | H04N 21/431 |

FOREIGN PATENT DOCUMENTS

| | | | |
|---|---|---|---|
| CN | 110032418 | A | 7/2019 |
| CN | 105892868 | B | 8/2019 |
| CN | 110096326 | A | 8/2019 |
| CN | 110737386 | A | 1/2020 |
| CN | 113552986 | A | 10/2021 |
| WO | 2016095342 | A1 | 6/2016 |

OTHER PUBLICATIONS

CNIPA, Second Office Action for CN Application No. 202110260714.6, Nov. 3, 2024.
CNIPA, Third Office Action for CN Application No. 202110260714.6 mailed on Feb. 6, 2025.
CNIPA, Decision of Rejection for CN Application No. 202110260714.6 mailed on Mar. 31, 2025.
CNIPA, First Office Action for CN Application No. 202110260714.6, Mar. 21, 2024.
EPO, Extended European Search Report for EP Application No. 22766225.1 mailed on Jul. 9, 2024.

* cited by examiner

SCREENSHOT METHOD, ELECTRONIC DEVICE AND COMPUTER-READABLE STORAGE MEDIUM

CROSS-REFERENCE OF RELATED APPLICATIONS

This application is a continuation of International Application No. PCT/CN2022/079210 filed Mar. 4, 2022, which claims priority to Chinese Patent Application No. 202110260714.6 filed Mar. 10, 2021. The above-mentioned applications are hereby incorporated by reference in their entireties.

TECHNICAL FIELD

The present disclosure relates to the field of electronic devices, and in particular to a screenshot method, an electronic device and a non-transitory computer-readable storage medium.

BACKGROUND

Screenshot is a way to capture pictures or texts, and it may be used to capture a text, a picture, or the like that a user is interested in and displayed on a display screen. At present, screenshot operations are mostly performed on an entire display screen of an electronic device, to capture the whole content currently displayed on the display screen. However, when multiple display windows are displayed on the display screen and one or more windows of the multiple display windows need to be captured separately, the whole content of the display screen needs to be first captured, and then the user needs to manually edit and crop the captured image with picture editing software, to obtain a screenshot of the desired one or more windows after cropping.

SUMMARY

In view of the above, embodiments of the present disclosure provide a screenshot method, an electronic device, and a non-transitory computer-readable storage medium.

In a first aspect, the embodiments of the present disclosure provide a screenshot method, and the method includes operations as follows. In response to a screenshot operation, a screenshot of each of multiple display windows displayed on a screen is separately acquired as a first screenshot, to obtain first screenshots of the multiple display windows. At least one second screenshot, each being a screenshot of at least two display windows of the multiple display windows, is acquired. The first screenshots and the at least one second screenshot are displayed in a preview mode. In response to a selection operation for a target screenshot of the screenshots displayed in the preview mode, the target screenshot is saved.

In a second aspect, the embodiments of the present disclosure provide an electronic device. The electronic device includes one or more processors, a memory and one or more application programs stored in the memory. The one or more application programs, when being executed by the one or more processors, cause the one or more processor to: in response to a screenshot operation, acquire separately first screenshots of multiple display windows displayed on a screen, each of the first screenshots being a screenshot of one of the multiple display windows; acquire at least one second screenshot each being a screenshot of at least two display windows of the multiple display windows; display the first screenshots and the at least one second screenshot; and in response to a screenshot being selected from the displayed screenshots, save the selected screenshot.

In a third aspect, the embodiments of the present disclosure provide a non-transitory computer-readable storage medium having program codes stored therein. The program codes are executed by a processor to: in response to a multi-finger sliding operation or a sliding operation along a preset trajectory, acquire separately first screenshots of multiple display windows displayed on a screen, each of the first screenshots being a screenshot of one of the multiple display windows; acquire at least one second screenshot each being a screenshot of at least two display windows of the multiple display windows; display the first screenshots and the at least one second screenshot; and in response to a selection operation for a target screenshot of the displayed screenshots, save the target screenshot.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

In order to more clearly explain technical solutions of the embodiments of the present disclosure, drawings used in the embodiments will be briefly introduced below. Obviously, the drawings as described below are merely some embodiments of the present disclosure. Based on these drawings, other drawings can be obtained by those skilled in the art without inventive effort.

DETAILED DESCRIPTION OF PREFERRED EMBODIMENTS

Figure 1:
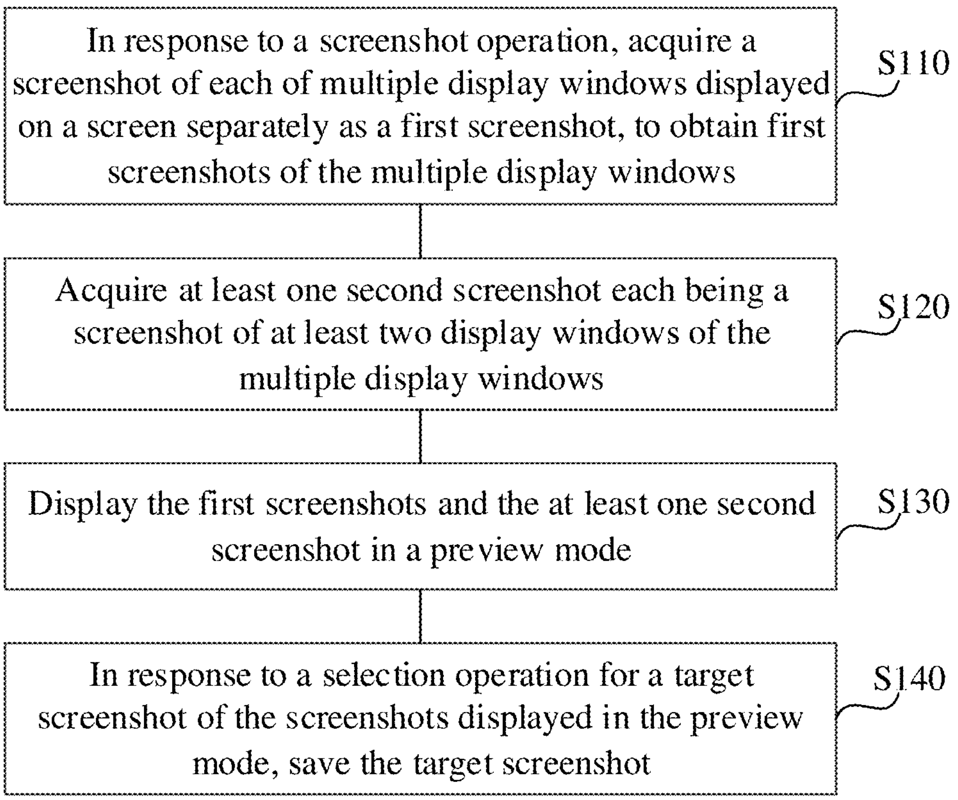
FIG. 1 is a flowchart of a screenshot method according to an embodiment of the present disclosure.

In order to make those skilled in the art better understand the solutions of the present disclosure, the technical solutions in the embodiments of the present disclosure will be clearly and comprehensively described below with reference to the accompanying drawings in the embodiments of the present disclosure.

Screenshot is a way to capture pictures or texts, and it may be used to capture a text, a picture, or the like that a user is interested in and displayed on a display screen. At present, screenshot operations are mostly performed on an entire display screen of an electronic device, to capture the whole content currently displayed on the display screen. However, when multiple display windows are displayed on the display screen and one or more windows of the multiple display windows need to be captured separately, the whole content of the display screen needs to be first captured, and then the user needs to manually edit and crop the captured image with picture editing software, to obtain a screenshot of the desired one or more windows after cropping. The operation process is tedious, which reduces the screenshot efficiency.

The embodiments of the present disclosure provide a screenshot method including:

in response to a screenshot operation, acquiring separately a screenshot of each of multiple display windows displayed on a screen as a first screenshot, to obtain first screenshots of the multiple display windows;

acquiring at least one second screenshot each being a screenshot of at least two display windows of the multiple display windows;

displaying the first screenshots and the at least one second screenshot in a preview mode; and in response to a selection operation for a target screenshot of the screenshots displayed in the preview mode, saving the target screenshot.

In an implementation, acquiring separately the screenshot of each of the multiple display windows displayed on the screen as the first screenshot, includes: capturing a whole content currently displayed on the screen, to obtain a full-screen screenshot; and cropping the full-screen screenshot according to the individual display windows, to obtain the screenshot of each of the display windows as the first screenshot.

In an implementation, cropping the full-screen screenshot according to the individual display windows to obtain the screenshot of each of the display windows as the first screenshot, includes: in response to the multiple display windows including at least one floating window and at least one bottom window, determining an obscured area of each of the at least one bottom window obscured by the at least one floating window; determining a first image of the obscured area of the bottom window and a second image of an unobscured area of the bottom window; and determining a first screenshot of the bottom window, based on the first image and the second image.

In an implementation, acquiring at least one second screenshot each being a screenshot of at least two display windows of the multiple display windows, includes: combining the first screenshots of the individual display windows arbitrarily to obtain multiple screenshot sets, where each of the screenshot sets includes the first screenshots of at least two display windows; and splicing all the first screenshots of each of the screenshot sets, to obtain multiple spliced screenshots as the second screenshots.

In an implementation, acquiring at least one second screenshot each being a screenshot of at least two display windows of the multiple display windows, includes: capturing a whole content currently displayed on the screen, to obtain a screenshot as the second screenshot.

In an implementation, displaying the first screenshots and the at least one second screenshot in the preview mode, includes: displaying the first screenshots and the at least one second screenshot in the preview mode on a preview display interface.

In an implementation, the preview display interface includes a thumbnail display area and a zoom-in display area, and displaying the first screenshots and the at least one second screenshot in the preview mode, includes: determining thumbnails of the first screenshots and the at least one second screenshot, and displaying the thumbnails in the thumbnail display area; and in response to a switching operation for a screenshot corresponding to a thumbnail selected from the displayed thumbnails, zooming in and displaying the first screenshot or the second screenshot corresponding to the switching operation in the zooming-in display area, according to the switching operation.

In an implementation, displaying the first screenshots and the at least one second screenshot in the preview mode, includes: determining display priorities of the first screenshots and the at least one second screenshot; and displaying the first screenshots and the at least one second screenshot in the preview mode, in a descending order of the display priorities.

In an implementation, determining the display priority of the at least one second screenshot includes: in response to the at least one second screenshot including a designated screenshot, determining the display priority of the designated screenshot as a highest priority, where the designated screenshot is a screenshot of all the multiple display windows.

In an implementation, before acquiring separately the screenshot of each of the multiple display windows displayed on the screen as the first screenshot in response to the screenshot operation, the method further includes: determining that the screenshot operation is received, in response to detecting a preset touch operation performed on the screen. Determining the display priorities of the first screenshots and the at least one second screenshot includes: in response to the preset touch operation being completely within a target display window displayed on the screen, determining a display priority of the first screenshot of the target display window as a highest priority; alternatively, in response to the preset touch operation being within at least two designated display windows displayed on the screen, determining a display priority of the second screenshot of the at least two designated display windows as a highest priority.

In an implementation, displaying the first screenshots and the at least one second screenshot in the preview mode, includes: determining whether a screenshot editing operation is received within a preset duration; and in response to the screenshot editing operation being received within the preset duration, responding to the screenshot editing operation, and displaying the first screenshots and the at least one second screenshot in the preview mode.

In an implementation, determining whether the screenshot editing operation is received within the preset duration, includes: determining a to-be-previewed screenshot from the first screenshots and the at least one second screenshot, and displaying the to-be-previewed screenshot; and determining whether the screenshot editing operation is received within the preset duration.

In an implementation, the screenshot method further includes: saving the to-be-previewed screenshot, in response to receiving no screenshot editing operation within the preset duration.

In an implementation, determining the to-be-previewed screenshot from the first screenshots and the at least one second screenshot, and displaying the to-be-previewed screenshot, includes: determining display priorities of the first screenshots and the at least one second screenshot; and displaying, as the to-be-previewed screenshot, a screenshot whose display priority is highest among the display priorities of the first screenshots and the at least one second screenshots.

In an implementation, the at least one second screenshot includes a designated screenshot of all the multiple display windows, and after determining whether the screenshot editing operation is received within the preset time period, the method further includes: saving the designated screenshot, in response to no screenshot editing operation is received within the preset duration.

As illustrated in FIG. 1, a flowchart of a screenshot method according to an embodiment of the present disclosure is illustrated. In a specific implementation, the screenshot method may be applied to a screenshot apparatus 700 illustrated in FIG. 19 and an electronic device (FIG. 20) configured with the screenshot apparatus 700. The flowchart illustrated in FIG. 1 is described in detail below. The screenshot method specifically includes operations as follows.

At block S110, in response to a screenshot operation, a screenshot of each of multiple display windows displayed on a screen is acquired separately as a first screenshot, to obtain first screenshots of the multiple display windows.

The screenshot operation is configured to trigger the electronic device to capture a screenshot on the screen content displayed on the display screen. The screenshot operation may be triggered after the electronic device detects that a physical key on the electronic device is pressed by a user, for example, it may be triggered upon detecting that a combination of keys (for example, a power key plus a volume key) is pressed. Alternatively, the screenshot operation may be triggered after the electronic device detects that a preset touch operation is performed on the display screen by the user. As an implementation, the screenshot operation may be triggered after the electronic device detects that the user touches a virtual key displayed on the display screen. For example, the user may call out a toolbar through a preset gesture, and touch a screenshot virtual key provided in the toolbar to trigger the screenshot operation. As another implementation, the screenshot operation may be triggered after the electronic device detects that a sliding operation along a preset trajectory is performed by the user on the display screen, or that a multi-finger sliding operation is performed by the user on the display screen. This is not limited in the embodiments of the present disclosure.

In the embodiments of the present disclosure, when the electronic device detects the screenshot operation, the electronic device may respond to the screenshot operation. In an implementation, the electronic device may acquire separately the screenshot of each of the multiple display windows displayed on the display screen as the first screenshot, to obtain first screenshots of the multiple display windows. Thus, in the case where multiple display windows are displayed on the screen, the screenshot of each window may be obtained separately.

Figure 2:
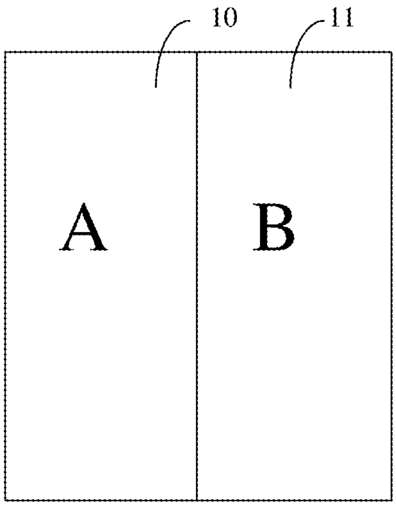
FIG. 2(1) and FIG. 2(2) are schematic diagrams illustrating interfaces according to an embodiment of the present disclosure.
Figure 2:
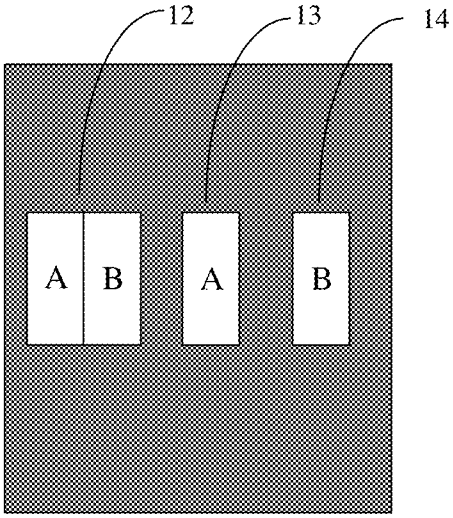
Figure 3:
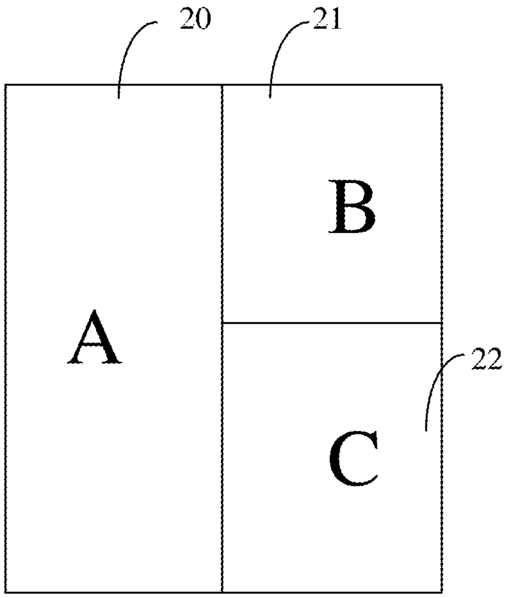
FIG. 3(1) and FIG. 3(2) are schematic diagrams illustrating interfaces according to another embodiment of the present disclosure.
Figure 3:
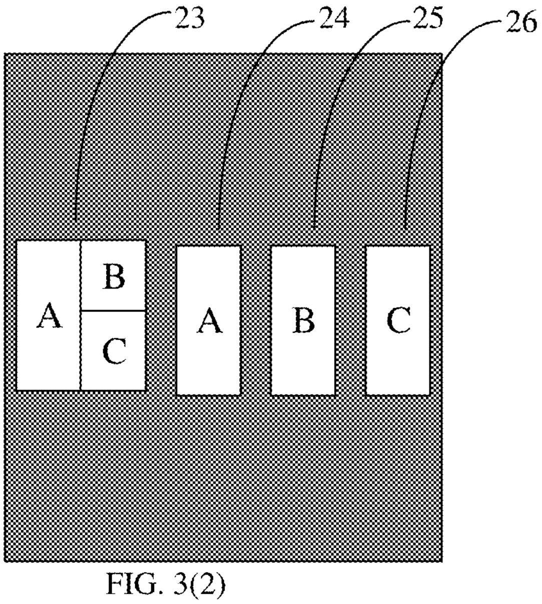

In some embodiments, the multiple display windows displayed on the screen may be multiple split-screen windows obtained by dividing a display area of the display screen when the electronic device is in a split-screen display mode. For example, as illustrated in FIG. 2(1), the display screen is in a split-screen display mode and there are two split-screen windows, A and B, the electronic device may capture a screenshot on the content displayed on each of window A 10 and window B 11, to obtain a screenshot 13 of the separate window A and a screenshot 14 of the separate window as illustrated in FIG. 2 (2), where the screenshot 13 and the screenshot 14 are the first screenshots obtained by the electronic device. For another example, as illustrated in FIG. 3(1), the display screen is in the split-screen display mode and there are three split-screen windows, A, B, and C, the electronic device may capture a screenshot on the content displayed on each of window A 20, window B 21, and window C 22, to obtain a screenshot 24 of the separate window A, a screenshot 25 of the separate window B, and a screenshot 26 of the separate window C as illustrated in FIG. 3(2), where the screenshot 24, the screenshot 25, and the screenshot 26 are the first screenshots obtained by the electronic device.

Figure 4:
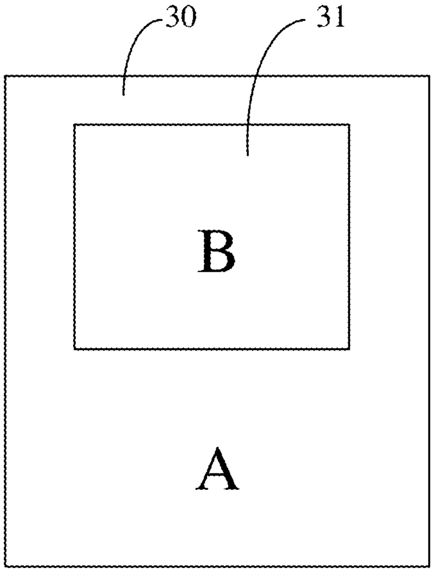
FIG. 4(1) and FIG. 4(2) are schematic diagrams illustrating interfaces according to a further embodiment of the present disclosure.
Figure 4:
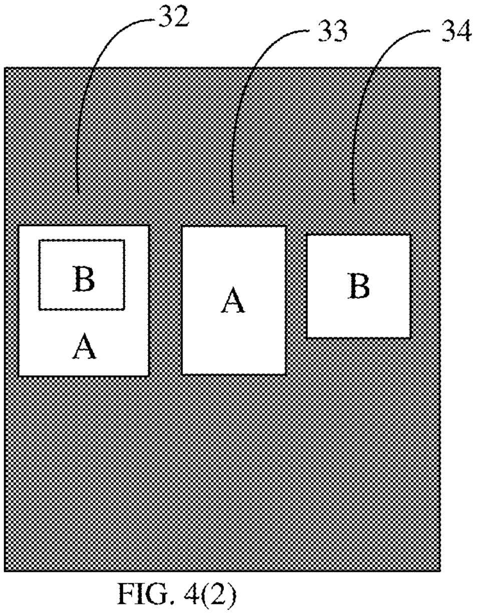

In some other embodiments, the multiple display windows displayed on the screen may also include a bottom window and a floating window floating on the bottom window of the electronic device in a floating display mode. For example, as illustrated in FIG. 4(1), the display screen is in the floating display mode and there are one bottom window A 30 and one floating window B31, the electronic device may capture a screenshot on the content displayed on each of the windows A 30 and B 31, to obtain a screenshot 33 of the separate window A and a screenshot 34 of the separate window B as illustrated in FIG. 4(2), where the screenshot 33 and the screenshot 34 are the first screenshots obtained by the electronic device.

Figure 5:
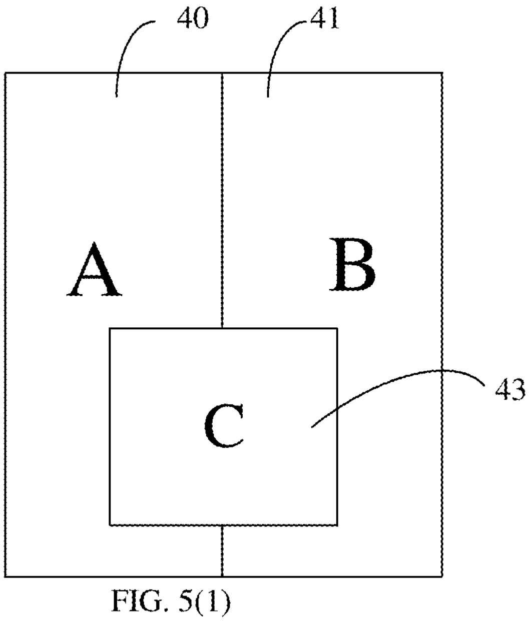
FIG. 5(1) and FIG. 5(2) are schematic diagrams illustrating interfaces according to yet a further embodiment of the present disclosure.
Figure 5:
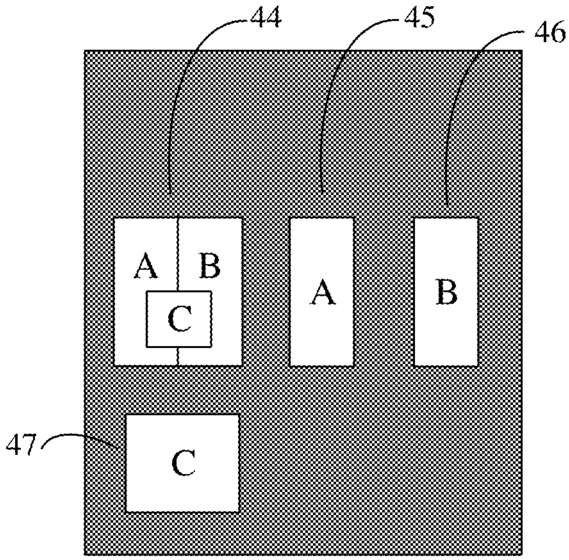

When the electronic device is in the split-screen display mode and the floating display mode simultaneously, the multiple display windows may include a split-screen window and a floating window, which is not limited herein. For example, as illustrated in FIG. 5(1), the display screen is in the split-screen display mode and there are two split-screen windows, A and B, and there is one floating window C, the electronic device may capture a screenshot on the content displayed on each of the windows A 40, B 41, and C 42, to obtain a screenshot 45 of the separate window A, a screenshot 46 of the separate window B, and a screenshot 47 of the separate window C as illustrated in FIG. 5(2), where the screenshot 45, the screenshot 46, and the screenshot 47 are the first screenshots obtained by the electronic device.

In some embodiments, the electronic device may first determine, from multiple current layers of the display screen, a layer where each display window displayed on the screen is located, and then capture a screenshot on the content displayed on the layer of each display window, to obtain the screenshots of the individual display windows on the display screen as the first screenshots.

In some other embodiments, the electronic device may first capture a screenshot the whole content currently displayed on the display screen to obtain a full-screen screenshot; and then, the electronic device may crop the full-screen screenshot according to the individual display windows, to obtain the cropped screenshots of the individual display windows as the first screenshots. It is understandable that, when the electronic device is in the floating display mode, since the floating window floats on the bottom window, a part of content in the bottom window is obscured by the floating window. Therefore, in the case where the screenshots of the individual display windows are obtained by cropping the full-screen screenshot, supplementary rending needs to be performed on the part of the bottom window obscured by the floating window, to ensure integrity of the obtained screenshot of the bottom window. Specifically, a first image of the obscured area of the bottom window and a second image of an unobscured area of the bottom window are determined, and the first screenshot of the bottom window is determined based on the first image and the second image, where the supplementary rendering may be performed according to previous few image frames in the buffer space.

At block S120, at least one second screenshot each being a screenshot of at least two display windows of the multiple display windows is acquired.

In the embodiment of the present disclosure, in response to the screenshot operation, the electronic device may further acquire at least one second screenshot each being a screenshot of at least two display windows of the multiple display windows. Therefore, in the case where multiple display windows are displayed on the screen, in addition to the screenshots of the individual separate windows, the screenshot of a combined window consisting of at least two display windows may be acquired, thereby enriching a screenshot function and improving a screenshot effect.

In some embodiments, the second screenshot may be a screenshot of a combined window consisting of all the multiple display windows, that is, the screenshot may include contents displayed in all the display windows on the display screen, which may be understood as a full-screen screenshot.

For example, as illustrated in FIG. 2(1) again, two split-screen windows, A and B, are displayed on the display screen, the electronic device may acquire a screenshot including the content displayed in window A 10 and the content displayed in window B 11, to obtain a screenshot 12 of a combined window consisting of the window A and the window B as illustrated in FIG. 2(2), where the screenshot 12 is the second screenshot obtained by the electronic device. For example, as illustrated in FIG. 3(1) again, three split-screen windows, A, B, and C, are displayed on the display screen, the electronic device may acquire a screenshot including all the content displayed in window A 20, the content displayed in window B 21, and the content displayed in window C 22, to obtain a screenshot 23 of a combined window consisting of the window A, window B and the window C as illustrated in FIG. 3(2), where the screenshot 23 is the second screenshot obtained by the electronic device. Similarly, for another example, a screenshot 32 of a combined window consisting of the bottom window A and the floating window B is illustrated in FIG. 4(2), a screenshot 44 of a combined window consisting of the bottom split-screen window A, a bottom split-screen window B and the floating window C is illustrated in FIG. 5 (2), and the screenshots 32 and 44 are the second screenshots obtained by the electronic device.

In some other embodiments, the second screenshot may be a screenshot of a combined window consisting of a part of the multiple display windows, that is, the screenshot may include content(s) displayed in a part of the multiple display windows on the display screen.

Figure 6:
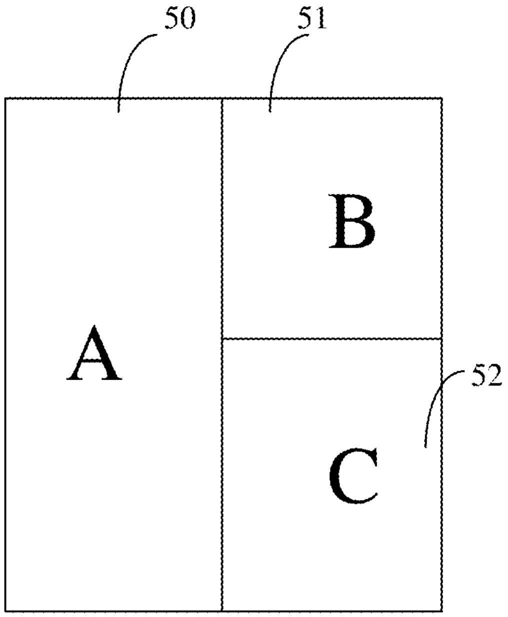
FIG. 6(1) and FIG. 6(2) are schematic diagrams illustrating interfaces according to yet a still further embodiment of the present disclosure.
Figure 6:
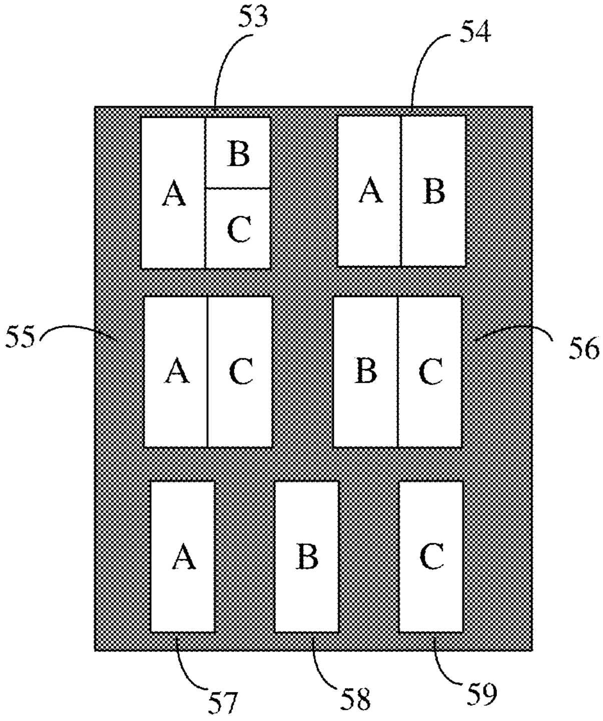

For example, as illustrated in FIG. 6(1), three split-screen windows, A, B, and C, are displayed on the display screen, the electronic device may acquire a screenshot including contents displayed in window A 50, window B 51 and window C52, and may also acquire a screenshot including contents displayed in any two windows of the window A 50, the window B 51 and the window C 52, to obtain a screenshot 53 of a combined window consisting of the window A, the window B, and the window C, a screenshot 54 of a combined window consisting of the window A and the window B, a screenshot 55 of a combined window consisting of the window A and the window C, a screenshot 56 of a combined window consisting of the window B and the window C, as illustrated in FIG. 6(2), where the screenshots 53, 54, 55, and 56 are the second screenshots obtained by the electronic device.

Figure 7:
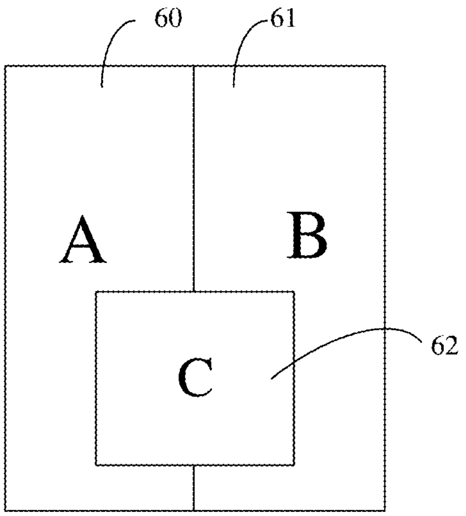
FIG. 7(1) and FIG. 7(2) are schematic diagrams illustrating interfaces according to yet a still further embodiment of the present disclosure.
Figure 7:
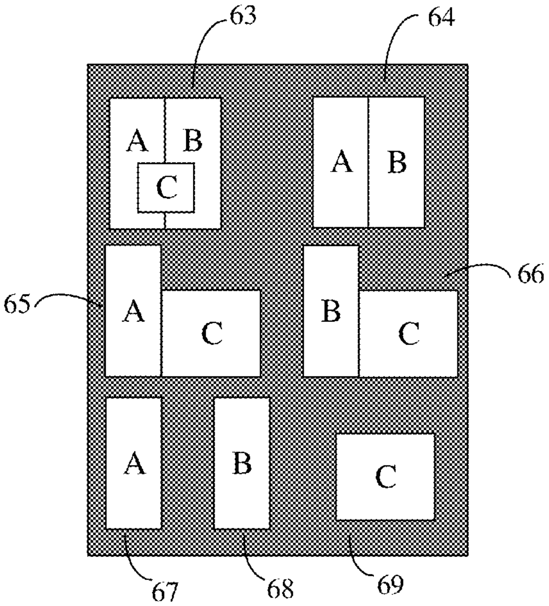

For another example, as illustrated in FIG. 7(1), the display screen is in the split-screen display mode and the floating display mode, and there are two split-screen windows, A, B, and one floating window C, the electronic device may acquire a screenshot on the content displayed in each of window A 60, window B 61, and window C 62, to obtain a screenshot 63 of a combined window consisting of the window A, the window B, and the window C, a screenshot 64 of a combined window consisting of the window A and the window B, a screenshot 65 of a combined window consisting of the window A and the window C, and a screenshot 66 of a combined window consisting of the window B and the window C, as illustrated in FIG. 7(2), where the screenshots 63, 64, 65, and 66 are the second screenshots obtained by the electronic device.

In some embodiments, in acquiring the at least one second screenshot each being a screenshot of at least two display windows of the multiple display windows, the electronic device may first acquire a screenshot of all the windows, and then obtain, by reducing one window in turn, screenshots of remaining windows, until screenshots of any combinations of the multiple display windows are obtained.

At block S130: displaying the first screenshot and the second screenshot in a preview manner.

In the embodiment of the present disclosure, after the first screenshots and the at least one second screenshot are obtained, the electronic device may display the first screenshots and the at least one second screenshot in a preview mode, so that the user may intuitively browse diagrams illustrating effects of multiple types of screenshots, which is beneficial for the user to directly select a desired type of screenshot based on the diagrams illustrating the effects.

In some embodiments, the first screenshots and the at least one second screenshot may be directly displayed on the current interface in a floating window, or a preview display interface may be constructed and the first screenshots and the at least one second screenshot are displayed in a preview mode on the preview display interface, as illustrated in FIG. 2 to FIG. 7.

In some embodiments, when the first screenshots and the at least one second screenshot are displayed on the preview display interface in the preview mode, the preview display interface may be divided into a thumbnail display area and a zoom-in display area. The electronic device may generate thumbnails of the first screenshots and the at least one second screenshot, and display the thumbnails in the thumbnail display area. In response to a switching operation for a screenshot corresponding to a thumbnail selected from the thumbnails, the selected screenshot is zoomed in and displayed on the zoom-in display area according to the switching operation.

Figure 8:
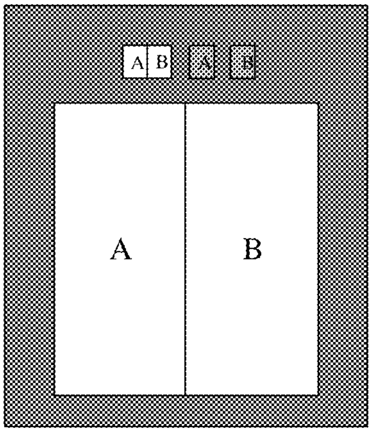
FIG. 8(1), FIG. 8(2) and FIG. 8(3) are schematic diagrams illustrating interfaces according to yet a still further embodiment of the present disclosure.
Figure 8:
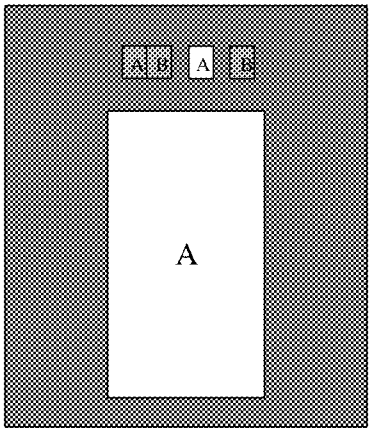
Figure 8:
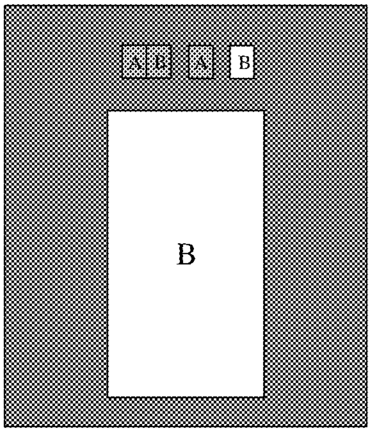
Figure 9:
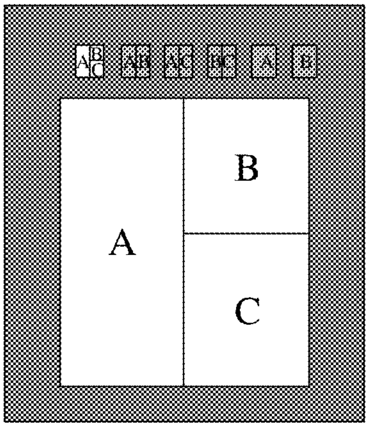
FIG. 9(1), FIG. 9(2) and FIG. 9(3) are schematic diagrams illustrating interfaces according to yet a still further embodiment of the present disclosure.
Figure 9:
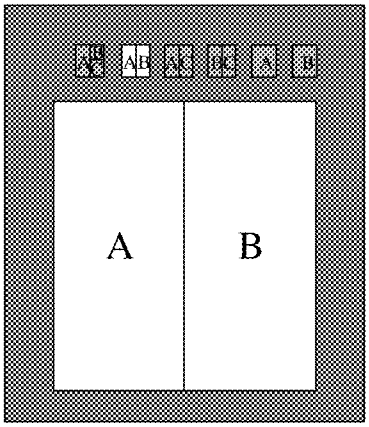
Figure 9:
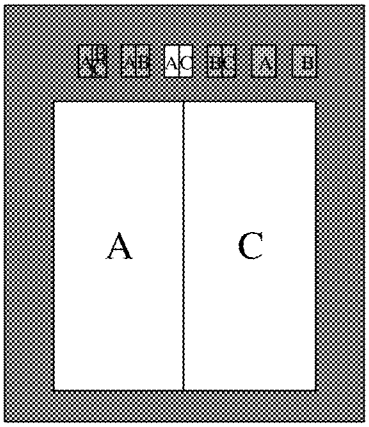

As an implementation, the thumbnail display area and the zoom-in display area may be distributed in an up-down direction. For example, as illustrated in FIG. 8(1), FIG. 8(2) and FIG. 8(3), for the case where two split-screen windows, A and B, are displayed on the screen as illustrated in FIG. 2(1), the thumbnail display area is displayed at an upper part of the preview display interface, the thumbnails of the first screenshots and the second screenshot are displayed on the thumbnail display area, and the user may switch the thumbnails in a left-right direction. The zoom-in display area is displayed at a lower part of the preview display interface, and a screenshot selected by the user is zoomed in and displayed in the zoom-in display area. For another example, as illustrated in FIG. 9(1), FIG. 9(2) and FIG. 9(3), for the case where three split-screen windows, A, B and C, are displayed on the screen as illustrated in FIG. 3(1), the thumbnail display area is at the upper part of the preview display interface, thumbnails of the first screenshots and the second screenshots are displayed on the thumbnail display area, and the user may switch the thumbnails in a left-right direction. The zoom-in display area is located at the lower part of the preview display interface, and a screenshot selected by the user is zoomed in and displayed in the zoom-in display area.

Figure 10:
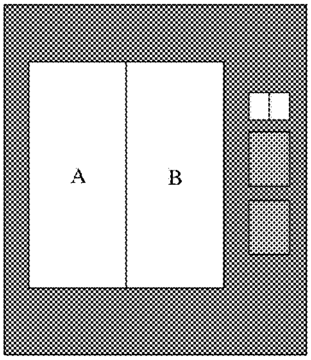
FIG. 10(1), FIG. 10(2) and FIG. 10(3) are schematic diagrams illustrating an interface according to yet a still further embodiment of the present disclosure.
Figure 10:
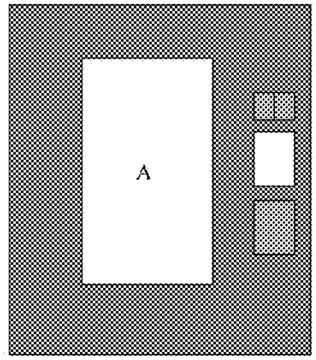
Figure 10:
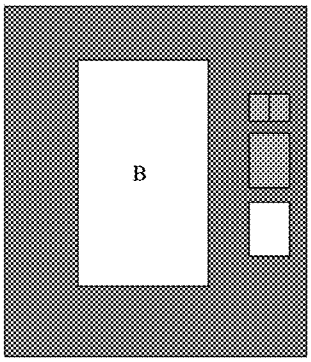
Figure 11:
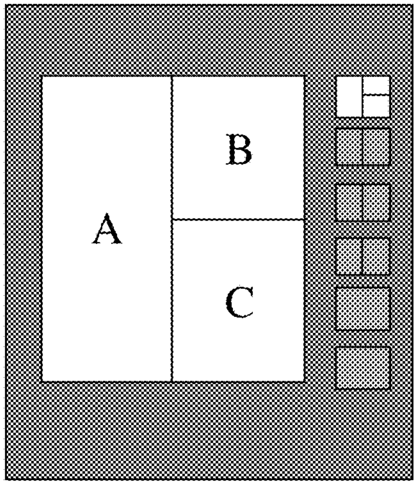
FIG. 11(1) and FIG. 11(2) are schematic diagrams illustrating interfaces according to yet a still further embodiment of the present disclosure.
Figure 11:
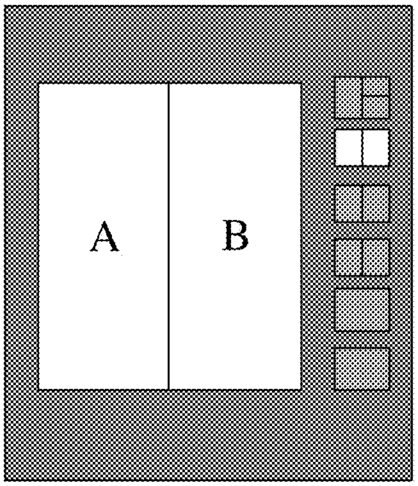

As an implementation, the thumbnail display area and the zoom-in display area may be distributed in the left-right direction. For example, as illustrated in FIG. 10(1), FIG. 10(2) and FIG. 10(3), for the case where two split-screen windows, A and B, are displayed on the screen as illustrated in FIG. 2(1), the thumbnail display area is located at a right part of the preview display interface, the thumbnails of the first screenshots and the second screenshot are displayed on the thumbnail display area, and the user may switch the thumbnails in the up-down direction. The zoom-in display area is located at a left part of the preview display interface, and the screenshot selected by the user is zoomed in and displayed in the zoom-in display area. For another example, as illustrated in FIG. 11(1) and FIG. 11(2), for the case where three split-screen windows, A, B and C, are displayed on the screen as illustrated in FIG. 3(1), the thumbnail display area is located at the right part of the preview display interface, the thumbnails of the first screenshots and the second screenshots are displayed on the thumbnail display area, and the user may switch the thumbnails in the up-down direction. The zoom-in display area is located at the left part of the preview display interface, and the screenshot selected by the user is zoomed in and displayed on the zoom-in display area.

In some embodiments, the preview display interface may also be provided with various editing operation controls, such as cutting, mirroring, text adding, watermark adding, sharing, deleting controls and other operation controls, which are not limited herein. As such, while the screenshots are displayed in the preview mode, various editing operations may be performed on the screenshots displayed in the preview mode. Optionally, the editing operation controls may be provided in a non-thumbnail display area of the preview display interface, where the non-thumbnail display area may be understood as other areas in the preview display interface than the thumbnail display area.

As an implementation, the editing operation controls may be specifically provided in the zoom-in display area of the preview display interface. Optionally, the zoom-in display area may include an editing area in which various editing operation controls are provided. The editing area may be provided at various positions of the zoom-in display area, for example, at a lower part of the zoom-in display area. Optionally, the zoom-in display area may also include multiple editing areas, and the multiple editing areas may be provided at different positions in the zoom-in display area based on different editing operation controls in the editing areas.

Figure 12:
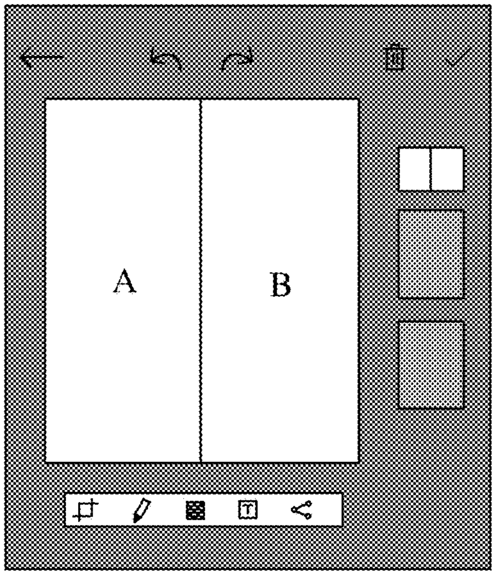
FIG. 12 is a schematic diagram illustrating an interface according to yet a still further embodiment of the present disclosure.

For example, as illustrated in FIG. 12, the zoom-in display area may include two editing areas, a first editing area may be provided below the zoom-in display area, and a second editing area may be provided above the zoom-in display area. The first editing area may include various specific editing operation controls such as cropping, text adding, watermark adding, sharing controls and other operation controls, for a target screenshot that is selected to be edited. The second editing area may include various editing operation controls, such as a control for deleting a screenshot, a control for selecting and saving a screenshot, and an editing operation control of dropping out a screenshot, for at least one screenshot displayed in the preview display interface.

At block S140, in response to a selection operation for a target screenshot of the screenshots displayed in the preview mode, the target screenshot is saved.

In the embodiment of the present disclosure, the electronic device displays the first screenshots and the at least one second screenshot in the preview mode, and detects whether a selection operation is received in real time. Upon detecting the selection operation, the electronic device may determine, based on the selection operation, a selected target screenshot from the first screenshots and the at least one second screenshot that are displayed in the preview mode, and save the target screenshot.

It is understandable that, in a case where multiple display windows are currently displayed on the display screen, when a screenshot operation is detected, there may be multiple requirements for a screenshot by the user. For example, the user may desire to capture a full-screen screenshot, a separate screenshot of a certain one window, or a combined screenshot of some of the windows. Therefore, in the embodiments of the present disclosure, the separate screenshots of the windows, the combined screenshot(s) of at least two windows, and other types of screenshots may be obtained and displayed in the preview mode. And the user may select from the first screenshots and the second screenshot(s) displayed in the preview mode, to intuitively determine his/her desired type of screenshot. After detecting a selection operation for a target screenshot of the screenshots displayed in the preview mode, the electronic device may determine that the selected target screenshot is a screenshot desired by the user, and save this screenshot. In this way, screenshots of one or several windows can be flexibly and quickly obtained, and there is no need to manually remove the contents displayed in other windows from the screenshot with the picture editing software, reducing the screenshot operation for the user.

In the screenshot method according to the embodiments of the present disclosure, in the case where multiple display windows are displayed on the screen, in response to a screenshot operation, the screenshot of each of the display windows displayed on the screen may be separately acquired as a first screenshot to obtain first screenshots of the multiple display windows, and at least one second screenshot, each being a screenshot of at least two display windows of the multiple display windows, may be acquired. Then, the first screenshots and the at least one second screenshot are displayed in a preview mode. In response to a selection operation for a target screenshot of the screenshots displayed in the preview mode, the target screenshot is saved. As such, in the case where the multiple display windows are displayed on the screen, the screenshots of the separate windows and the screenshot(s) of at least two display windows may be displayed in the preview mode, so that the user can select the desired type of screenshot from the preview images as required, and the screenshot(s) of one or some of the windows can be flexibly and quickly obtained. This enables the user to obtain the screenshot in a short time, and there is no need to manually remove the contents displayed in other windows from the screenshot with the picture editing software, simplifying the screenshot operation of the user.

Figure 13:
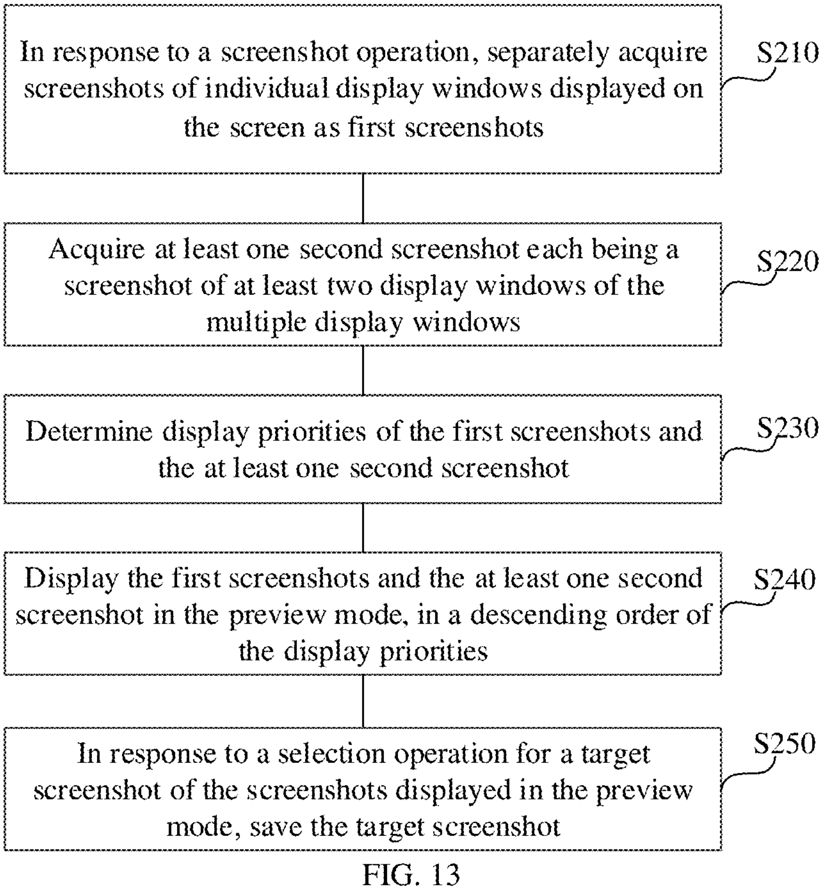
FIG. 13 is a flowchart of a screenshot method according to another embodiment of the present disclosure.

As illustrated in FIG. 13, a schematic flowchart of the screenshot method according to another embodiment of the present disclosure is illustrated. The process illustrated in FIG. 13 is described in detail below. The screenshot method specifically includes operations as follows.

At block S210, in response to a screenshot operation, screenshots of individual display windows displayed on the screen are separately acquired as first screenshots.

In some embodiments, the foregoing screenshot operation may be a preset touch operation performed by the user on the screen. The preset touch operation may be a multi-finger sliding operation, or a sliding operation along a preset trajectory such as "X". The electronic device may detect a touch operation of the user in real time, to determine whether the touch operation is the preset touch operation. When it is detected that the touch operation is the preset touch operation on the screen, it may be determined that the screenshot operation is received. And the electronic device may respond to the screenshot operation.

In some embodiments, when the screenshot operation is received, it may be determined whether the multiple display windows are currently displayed on the screen. When there is only one display window currently on the screen, the whole content currently displayed on the screen may be captured directly without performing the operations of acquiring the first screenshots and the at least one second screenshot of the present disclosure; in this case, the obtained full-screen screenshot is the screenshot desired by the user, and the electronic device may save the screenshot. When there are two or more windows currently displayed on the screen, since there are multiple types of screenshots, the first screenshots and the at least one second screenshot may be acquired and displayed in the preview mode as in the present disclosure, to determine the type of screenshot desired by the user; and in this case, the electronic device may save the type of screenshot finally selected by the user.

At block S220, at least one second screenshot, each being a screenshot of at least two display windows of the multiple display windows, is acquired.

Figure 14:
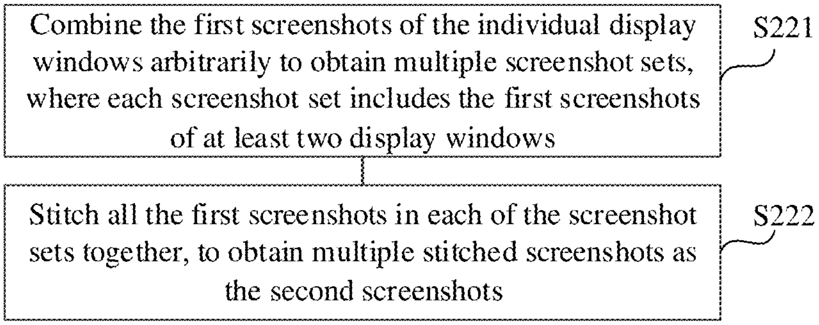
FIG. 14 is a flowchart of block S220 in the screenshot method according to the another embodiment of the present disclosure.

In some embodiments, the electronic device may arbitrarily combine the screenshots of the individual display windows, to exhaust all possible combinations; and then, obtain the at least one second screenshot according to the exhaustive combinations. Specifically, as illustrated in FIG. 14, block S220 may include operations as follows.

At block S221, the first screenshots of the individual display windows are combined arbitrarily to obtain multiple screenshot sets, where each screenshot set includes the first screenshots of at least two display windows.

In some embodiments, after acquiring the first screenshots of the individual display windows, the electronic device may arbitrarily combine the first screenshots to obtain multiple screenshot sets after combination, where each screenshot set includes the first screenshots of at least two display windows.

As an implementation, after the first screenshots of all the display windows are obtained, all the first screenshots may be put into a set C and serve as set elements thereof, and then subsets of the set C are taken. Since each first screenshot may also serve as a subset of the set C, the empty set and all subsets with only one element may be removed from the obtained subsets of the set C, and the remaining subsets may serve as the foregoing multiple screenshot sets, where each screenshot set includes at least two elements, that is, the first screenshots of the at least two display windows.

At block S222, all the first screenshots in each of the screenshot sets are stitched together, to obtain multiple stitched screenshots as the second screenshots.

In some embodiments, after the multiple screenshot sets are obtained, all the first screenshots in each screenshot set may be stitched together, to obtain multiple stitched screenshots as the second screenshots. As one implementation, all the first screenshots in each screenshot may be stitched together according to the original window layout of the multiple display windows, so that the obtained second screenshot is similar to the content displayed on the screen, which is convenient for user to operation. As another implementation, all the first screenshots in each screenshot may also be arranged for example in a left-right direction, or an up-to-down direction, and then stitched together. In this way, the content of each screenshot can be clearly seen, and the occlusion phenomenon of the original window layout is avoided.

In some embodiments, the second screenshot of all the windows may be obtained by stitching the first screenshots of all the display windows on the screen. Alternatively, the whole content currently displayed on the screen may be directly captured, and the captured screenshot is taken as the second screenshot of all the windows. It is understandable that, the full-screen screenshot obtained by directly capturing a screenshot on the whole content currently displayed on the screen already includes the display contents of all the display windows; in this case, the second screenshot of all the display windows may be directly obtained by capturing a full-screen screenshot without performing the foregoing splicing processing.

At block S230, display priorities of the first screenshots and the at least one second screenshot are determined.

In some embodiments, after the first screenshots and the at least one second screenshot are obtained, the electronic device may determine the display priorities of the first screenshots and the at least one second screenshot, so as to display the first screenshots and the at least one second screenshot in the preview mode according to the display priorities, to facilitate the selection operation of the user.

In the case where multiple display windows are displayed on the screen, when a screenshot operation is detected, the user usually desires to capture a full-screen screenshot. Therefore, as an implementation, the displaying of the full-screen screenshot in the preview mode may be prioritized. Specifically, when the foregoing obtained second screenshots include a designated screenshot, the display priority of the designated screenshot may be determined as the highest priority, where the designated screenshot is a screenshot of all the multiple display windows. That is, the displaying of the screenshot of all the display windows in the preview mode is prioritized.

Figure 15:
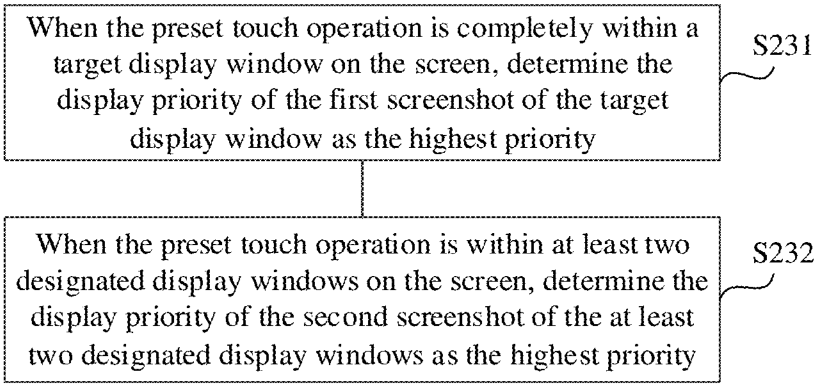
FIG. 15 is a flowchart of block S230 in the screenshot method according to the another embodiment of the present disclosure.

In some embodiments, when the screenshot operation is a preset touch operation, the type of screenshot desired by the user may also be determined based on the area of the preset touch operation. Specifically, as illustrated in FIG. 15, block S230 may include operations as follows.

At block S231, when the preset touch operation is completely within a target display window on the screen, the display priority of the first screenshot of the target display window is determined as the highest priority.

It is understandable that, since the area where the user operates may express the user's desire to a certain extent, when the preset touch operation is completely within the target display window of the screen, it may be considered that the user prefers the screenshot of the display content of the target display window. Therefore, the display priority of the first screenshot of the target display window may be determined as the highest priority, and the displaying of the first screenshot of the target display window in the preview mode may be prioritized.

At block S232, when the preset touch operation is within at least two designated display windows on the screen, the display priority of the second screenshot of the at least two designated display windows is determined as the highest priority.

Figure 16:
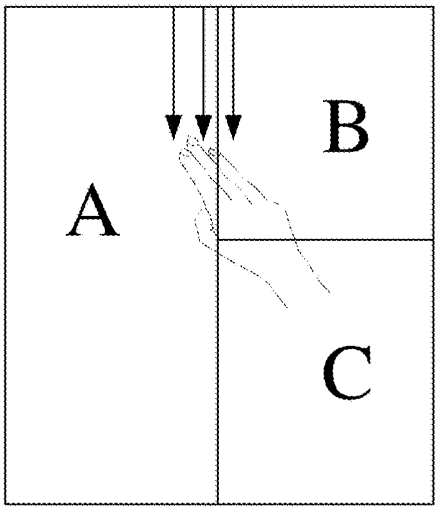
FIG. 16 is a schematic diagram illustrating an interaction according to an embodiment of the present disclosure.

Similarly, in the case where multiple display windows are displayed on the screen, when the preset touch operation is within at least two designated display windows of the screen, it may be considered that the user prefers a combined window screenshot of the at least two designated display windows. Therefore, the display priority of the second screenshot of the at least two designated display windows is determined as the highest priority. The displaying of the second screenshot of the display windows in which the user touch operation is performed may be prioritized in the preview mode. For example, as illustrated in FIG. 16, when the screenshot operation is a three-finger sliding operation, since the three-finger sliding operation is performed in the area of the display windows A and B, the displaying of the second screenshot of the display windows A and B may be prioritized in the preview mode.

In some embodiments, the first screenshots may also be set to have the lowest priority, so that the displaying of the first screenshots is at the last positions in the preview mode, which is not limited herein. For example, the priority of the full-screen screenshot may also be set as the highest priority, the priority of a screenshot (which may be the second screenshot or the first screenshot) corresponding to the preset touch operation is set as the secondary priority, and the priorities of the other screenshots are set as the lowest priority.

At block S240, the first screenshots and the at least one second screenshot are displayed in the preview mode, in a descending order of the display priorities.

In the embodiments of the present disclosure, after the display priorities of the first screenshots and the at least one second screenshot are determined, the first screenshots and the at least one second screenshot may be displayed in the preview mode, in the descending order of the display priorities. As another implementation, the first screenshots and the at least one second screenshot may be displayed in the preview mode one by one, in the descending order of the display priorities. As another implementation, the first screenshots and the at least one second screenshot may also be arranged in the descending order of the display priorities, and all the screenshots are displayed in the preview mode (as illustrated in FIG. 2 to FIG. 7).

In some embodiments, thumbnails of the first screenshots and the at least one second screenshot may be displayed in the preview mode, in the descending order of the display priorities. Specifically, when the preview display section is divided into the thumbnail display area and the zoom-in display area, the electronic device may generate the thumbnails of the first screenshots and the at least one second screenshot, and display the thumbnails in the thumbnail display area, in the descending order of the display priorities. In response to a switching operation for a selected screenshot in the displayed thumbnails, the selected screenshot is zoomed in and displayed in the zoom-in display area according to the switching operation.

At block S250, in response to a selection operation for a target screenshot of the screenshots displayed in the preview mode, the target screenshot is saved.

In the embodiment of the present disclosure, for block S250, reference may be made to the contents in the foregoing embodiments, and details thereof are not repeated here.

In the screenshot method according to the embodiments of the present disclosure, in the case where multiple display windows are displayed on the screen, in respond to a screenshot operation, the screenshot of each of the display windows displayed on the screen may be separately acquired as a first screenshot to obtain first screenshots of the multiple display windows, and at least one second screenshot, each being a screenshot of at least two display windows of the multiple display windows, may be acquired. Then, the display priorities of the first screenshots and the at least one second screenshot are determined, and the first screenshots and the at least one second screenshot are displayed in the preview mode in a descending order of the display priorities. In response to a selection operation for a target screenshot of the screenshots displayed in the preview mode, the target screenshot is saved. In this way, in the disclosure, in the case where the multiple display windows are displayed on the screen, the screenshots of the separate windows and the screenshot(s) of at least two display windows may be acquired, and the display priorities of different types of screenshots are automatically evaluated, so that the displaying of the screenshot with the highest priority is prioritized in the preview mode. As such, the user can quickly select the desired type of screenshot from the preview images, and the screenshot(s) of one or some of the windows can be flexibly and quickly obtained. This enables the user to obtain the screenshot in a short time, and there is no need to manually remove the contents displayed in other windows from the screenshot with the picture editing software, simplifying the screenshot operation of the user.

Figure 17:
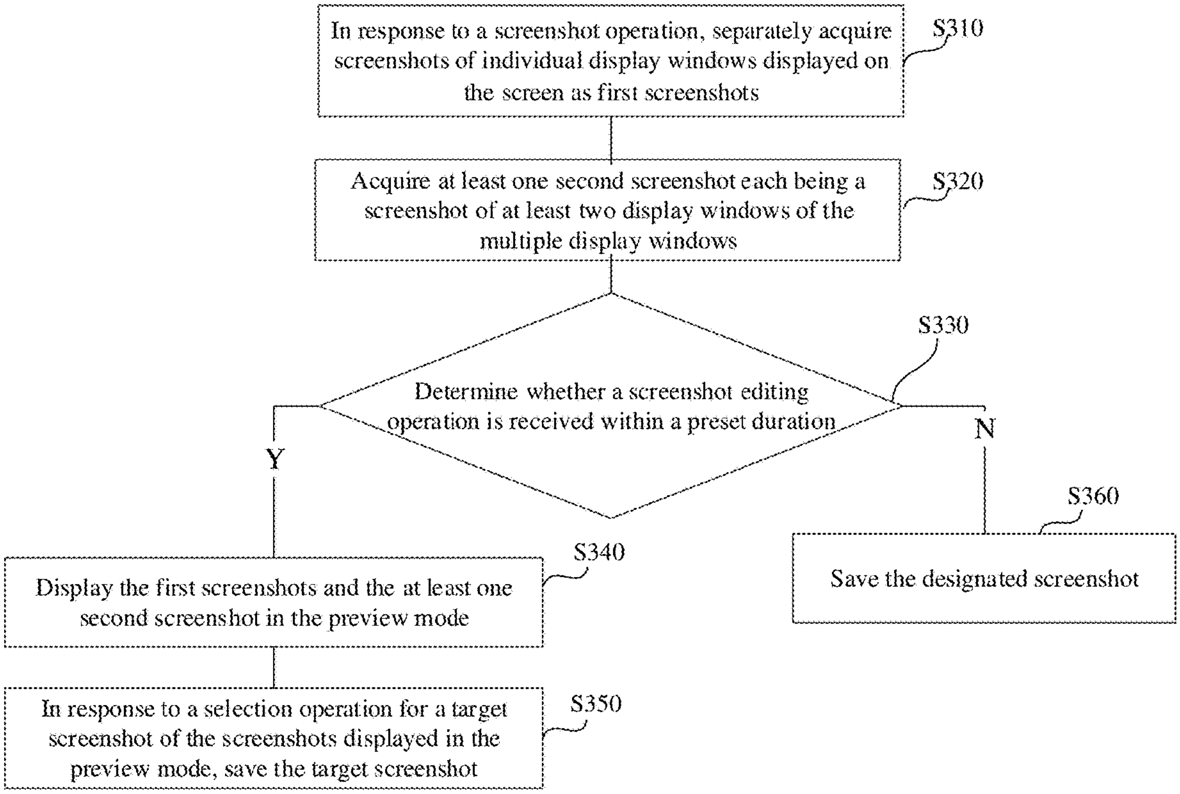
FIG. 17 is a flowchart of a screenshot method according to a further embodiment of the present disclosure.

As illustrated in FIG. 17, a flowchart of the screenshot method according to a further embodiment of the present disclosure is illustrated. The process illustrated in FIG. 17 is described in detail below. The screenshot method specifically includes operations as follows.

At block S310, in response to a screenshot operation, screenshots of individual display windows displayed on the screen are separately acquired as first screenshots.

At block S320, at least one second screenshot, each being a screenshot of at least two display windows of the multiple display windows, is acquired.

In the embodiment of the present disclosure, fore blocks S310 and S320, reference may be made to the contents in the foregoing embodiments, and details thereof are not repeated here.

At block S330, it is determined whether a screenshot editing operation is received within a preset duration. When the screenshot editing operation is received within the preset duration, it proceeds to block S340 and block S350. When the screenshot editing operation is not received within the preset duration, it proceeds to block S360.

At block S340, the first screenshots and the at least one second screenshot are displayed in the preview mode.

At block S350, in response to a selection operation for a target screenshot of the screenshots displayed in the preview mode, the target screenshot is saved.

At block S360, a designated screenshot is saved.

In some embodiments, after the first screenshots and the at least one second screenshot are obtained, one screenshot (i.e., a to-be-previewed screenshot) may be first selected to make its preview displayed, and then it is determined whether a screenshot editing operation is received within a preset duration. When the screenshot editing operation is not received within the preset duration, it shows that the screenshot whose preview is currently displayed is a screenshot desired by the user, and the screenshot may be directly saved. When the screenshot editing operation is received within the preset duration, it shows that the screenshot whose preview is currently displayed is probably not a screenshot desired by the user; and in this case, the first screenshots and the at least one second screenshot may be directly displayed in the preview mode for the user to select the desired type of screenshot, and the electronic device may save the screenshot selected by the user. The preset duration may be preset according to an actual scenario, which is not limited herein, for example, it may be 5S.

As an implementation, the foregoing screenshot that is selected to make its preview firstly displayed may be a screenshot set by default, for example, a designated screenshot (that is, a full-screen screenshot) of all the multiple display windows, or a screenshot of a first window located at the upper left corner. As another implementation, on the basis that the display priorities of the first screenshots and the at least one second screenshot are determined, a screenshot with the highest display priority may be used as the screenshot whose preview is firstly displayed.

In some embodiments, a preview of the selected screenshot may be displayed preferentially in a designated floating window, and in this case, the screenshot editing operation may be a touch operation performed on the designated floating window. When a touch operation performed on the designated floating window is detected, an editing interface is entered, and the first screenshots and the at least one second screenshot are displayed in the preview mode on the editing interface, in the descending order of the display priorities. In this way, by detecting whether the user performs an operation on the designated floating window, it may be determined whether the screenshot whose preview is currently displayed preferentially is a screenshot desired by the user, so as to determine whether to save the screenshot whose preview is currently displayed preferentially. In some other embodiments, the preview of the selected screenshot may also be displayed preferentially on a status bar, and in this case, the screenshot editing operation may be a touch operation performed on the screenshot displayed on the status bar. When a touch operation performed on the screenshot displayed on the status bar is detected, the editing interface may also be entered, and the first screenshots and the at least one second screenshot are displayed in the preview mode on the editing interface, in the descending order of the display priorities.

Figure 18:
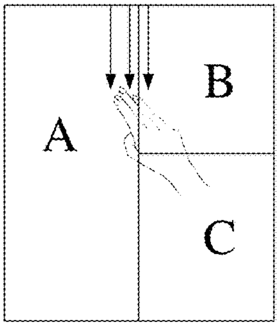
FIG. 18(1), FIG. 18(2) and FIG. 18(3) are schematic diagrams illustrating interactions according to a further embodiment of the present disclosure.
Figure 18:
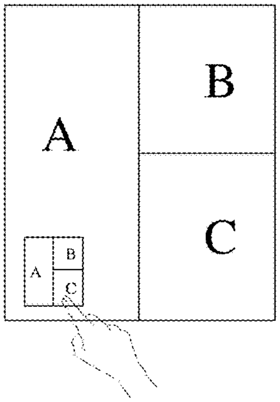
Figure 18:
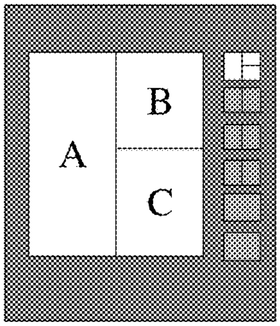

For example, as illustrated in FIG. 18(1), the display screen is in a split-screen display mode and there are three split-screen windows, A, B, and C, the user performs a three-finger sliding operation on the screen to trigger the screenshot operation. At this time, the electronic device captures a screenshot on the content displayed on each of window A, window B and window C, to obtain a first screenshot of the separate window A, a first screenshot of the separate window B, and a first screenshot of the separate window C. Moreover, the electronic device obtains a second screenshot of the window A, the window B, and the window C. As illustrated in FIG. 18(2), if the screenshot of all the windows has the highest display priority, the electronic device may display the second screenshot of the window A, the window B and the window C on the lower left corner of the screen in a floating window. When the user clicks on the floating window, an editing page may be entered. As illustrated in FIG. 18(3), the right part of the editing interface displays the thumbnails of the first screenshots and the second screenshot, and the user may click a thumbnail to switch the screenshot for view; and the screenshot selected by the user is zoomed in and displayed in the left part of the editing interface. The user may click "save" at the upper right corner after completing the editing, so that the electronic device may save only the selected type of screenshot.

In the screenshot method according to the embodiments of the present disclosure, in the case where multiple display windows are displayed on the screen, in response to a screenshot operation, the screenshot of each of the display windows displayed on the screen may be separately acquired as a first screenshot to obtain first screenshots of the multiple display windows, and at least one second screenshot, each being a screenshot of at least two display windows of the multiple display windows, may be acquired. Then, it is determined whether a screenshot editing operation is received within a preset duration. When the screenshot editing operation is received within the preset duration, in response to the screenshot editing operation, the first screenshots and the at least one second screenshot are displayed in the preview mode, and a target screenshot of the screenshots displayed in the preview mode is saved in response to a selection operation for the target screenshot. When the screenshot editing operation is not received within the preset duration, a designated screenshot is saved. Therefore, in the disclosure, in the case where multiple display windows are displayed on the screen, the screenshots of the separate windows and the screenshot(s) of the at least two display windows may be acquired, and all the types of screenshots are displayed in the preview mode only when a screenshot editing operation is received; thus, the efficiency of the screenshot operation is improved, and the power consumption is reduced.

Figure 19:
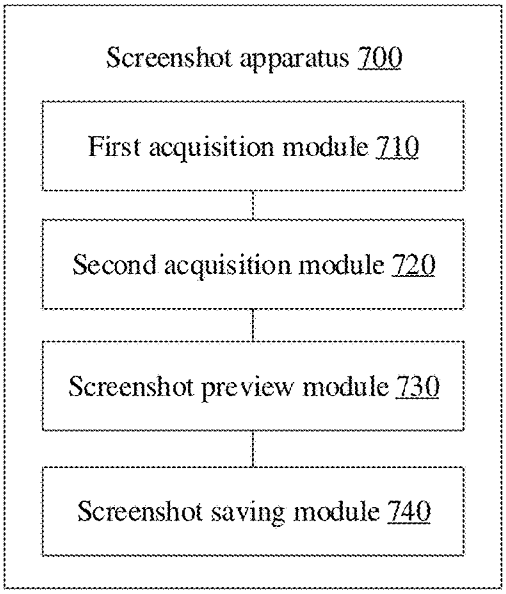
FIG. 19 is a block diagram of a screenshot apparatus according to an embodiment of the present disclosure.

As illustrated in FIG. 19, a structural block diagram of a screenshot apparatus 700 according to an embodiment of the present disclosure is provided. The screenshot apparatus 700 includes a first acquisition module 710, a second acquisition module 720, a screenshot preview module 730, and a screenshot saving module 740. The first acquisition module 710 is configured to, in response to a screenshot operation, acquire separately a screenshot of each of multiple display windows displayed on a screen as a first screenshot, to obtain screenshots of the multiple display windows. The second acquisition module 720 is configured to acquire at least one second screenshot each being a screenshot of at least two display windows of the multiple display windows. The screenshot preview module 730 is configured to display the first screenshots and the at least one second screenshot in a preview mode. The screenshot saving module 740 is configured to save a target screenshot in response to a selection operation for the target screenshot of the screenshots displayed in the preview mode.

In some embodiments, the first acquisition module 710 may further be configured to: capture a whole content currently displayed on the screen to obtain a full-screen screenshot; and crop the full-screen screenshot according to the individual display windows, to obtain the screenshot of each display window as the first screenshot.

In some embodiments, the first acquisition module 710 may be further configured to: when the multiple display windows include at least one floating window and at least one bottom window, determine an obscured area of the bottom window obscured by the floating window, determine a first image of the occluded area of the bottom window and a second image of an unobscured area of the bottom window, and determine the first screenshot of the bottom window based on the first image and the second image.

In some embodiments, the second acquisition module 720 may be specifically configured to: combine the first screenshots of the individual display windows arbitrarily to obtain multiple screenshot sets, where each screenshot set includes the first screenshots of at least two display windows; and splice together all the first screenshots in each of the screenshot sets, to obtain multiple spliced screenshots as the second screenshots.

In some embodiments, the second acquisition module 720 may be specifically configured to: capture a whole content currently displayed on the screen, to obtain a screenshot as the second screenshot.

In some embodiments, the screenshot preview module 730 may be specifically configured to: display the first screenshots and the at least one second screenshot in the preview mode on a preview display interface.

In some embodiments, the preview display interface includes a thumbnail display area and a zoom-in display area, and the screenshot preview module 730 may be specifically configured to: determine thumbnails of the first screenshots and the at least one second screenshot, and display the thumbnails in the thumbnail display area; and in response to a switching operation for a screenshot selected from the displayed thumbnails, zoom in and display the first screenshot or the second screenshot corresponding to the switching operation in the zoom-in display area, in response to the switching operation.

In some embodiments, the screenshot preview module 730 may include a priority determination unit and a preview display unit. The priority determination unit is configured to determine display priorities of the first screenshots and the at least one second screenshot. The preview display unit is configured to display the first screenshots and the at least one second screenshot in the preview mode, in a descending order of the display priorities.

In some embodiments, the priority determination unit may be specifically configured to: when the at least one second screenshot includes a designated screenshot, determine the display priority of the designated screenshot as the highest priority, where the designated screenshot is a screenshot of all the multiple display windows.

In some other embodiments, the screenshot apparatus 700 may further include an operation detection module configured to determine that the screenshot operation is received when a preset touch operation performed on the screen is detected.

In the embodiment, the priority determination unit may be specifically configured to: when the preset touch operation is completely within a target display window displayed on the screen, determine the display priority of the first screenshot of the target display window as the highest priority; and when the preset touch operation is within at least two designated display windows displayed on the screen, determine the display priority of the second screenshot of the at least two designated display windows as the highest priority.

In some embodiments, the screenshot preview module 730 may be further configured to: determine whether a screenshot editing operation is received within a preset duration; and when the screenshot editing operation is received within the preset duration, respond to the screenshot editing operation, and display the first screenshots and the at least one second screenshot in the preview mode.

In some embodiments, the screenshot preview module 730 may be further configured to: determine a to-be-previewed screenshot from the first screenshots and the at least one second screenshot, and display the determined to-be-previewed screenshot; and determine whether the screenshot editing operation is received within the preset duration.

In some embodiments, the screenshot preview module 730 may be further configured to save the to-be-previewed screenshot when the screenshot editing operation is not received within the preset duration.

In some embodiments, the screenshot preview module 730 may be further configured to: determine display priorities of the first screenshots and the at least one second screenshot; and display, as the to-be-previewed screenshot, a screenshot having the highest priority among the display priorities of the first screenshots and the at least one second screenshot.

In some embodiments, the at least one second screenshot may include a designated screenshot of all the multiple display windows, and the screenshot apparatus 700 may further include a saving-by-default module configured to save the designated screenshot when the screenshot editing operation is not received within the preset duration.

It is understandable clearly to those skilled in the art that, for the convenience and brevity of description, the specific working process of the foregoing apparatus and modules may refer to the corresponding process in the foregoing method embodiments, and details thereof are not repeated herein.

In the embodiments of the present disclosure, the coupling between the modules may be electrical, mechanical or in other forms.

In addition, the individual functional modules in the embodiments of the present disclosure may be integrated into one processing module, or may be separately present physically, or two or more modules may be integrated into one module. The foregoing integrated module may be implemented in hardware or software function modules.

In conclusion, the screenshot apparatus provided in the embodiment of the present disclosure is configured to implement the corresponding screenshot method in the foregoing method embodiments, and has the beneficial effects of the corresponding method embodiments, and details thereof are not repeated herein.

Figure 20:
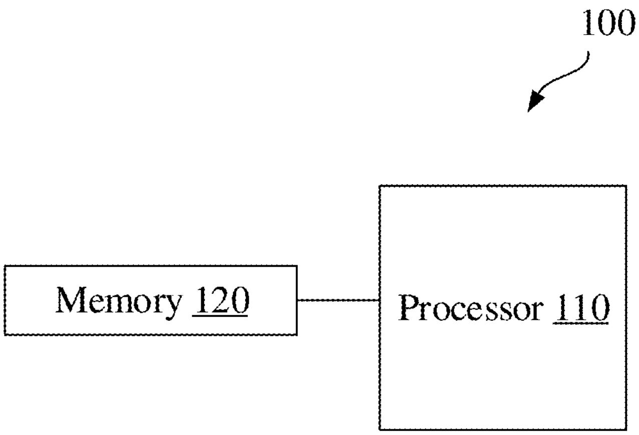
FIG. 20 is a block diagram of an electronic device configured to perform the screenshot method according to the embodiments of the present disclosure.

As illustrated in FIG. 20, a structural block diagram of an electronic device according to an embodiment of the present disclosure is illustrated. The electronic device 100 may be a terminal device capable of running an application program such as a personal computer or a mobile terminal. The electronic device 100 in the present disclosure may include one or more of the following components: a processor 110, a memory 120, and one or more application programs. The one or more application programs may be stored in the memory 120 and configured to be executed by one or more processors 110, and the one or more application programs are configured to perform the method described in the foregoing method embodiments.

The processor 110 may include one or more processing cores. The processor 110 connects various parts in the electronic device 100 by various interfaces and lines, executes various functions and processes data of the electronic device 100 by running or executing instructions, programs, code sets or instruction sets stored in the memory 120, and invoking data stored in the memory 120. Optionally, the processor 110 may be implemented in at least one of a digital signal processing (DSP), a field-programmable gate array (FPGA), and a programmable logic array (PLA). The processor 110 may be integrated with one or more of a central processing unit (CPU), a graphics processing unit (GPU), and a modem. The CPU mainly processes an operating system, a user interface, an application program, and the like; the GPU is responsible for rendering and drawing display content; and the modem is configured to process wireless communication. It may be understood that the modem may not be integrated into the processor 110, and may be implemented separately by a communications chip.

The memory 120 may include a random access memory (RAM), or a read-only memory (ROM). The memory 120 may be used to store instructions, programs, codes, code sets, or instruction sets. The memory 120 may include a program storage area and a data storage area, where the program storage area may store instructions for implementing an operating system, instructions for implementing at least one function (for example, a touch function, a sound playing function, and an image playing function), instructions for implementing the foregoing method embodiments, and the like. The data storage area may also store data (such as phone book, audio and video data, chat record data) generated by the electronic device 100 in use.

It may be understood that the structure illustrated in FIG. 20 is merely exemplary, and the electronic device 100 may further include more or fewer components than those shown in FIG. 20, or have a completely different configuration from that illustrated in FIG. 20. This is not limited in the embodiments of the present disclosure.

Figure 21:
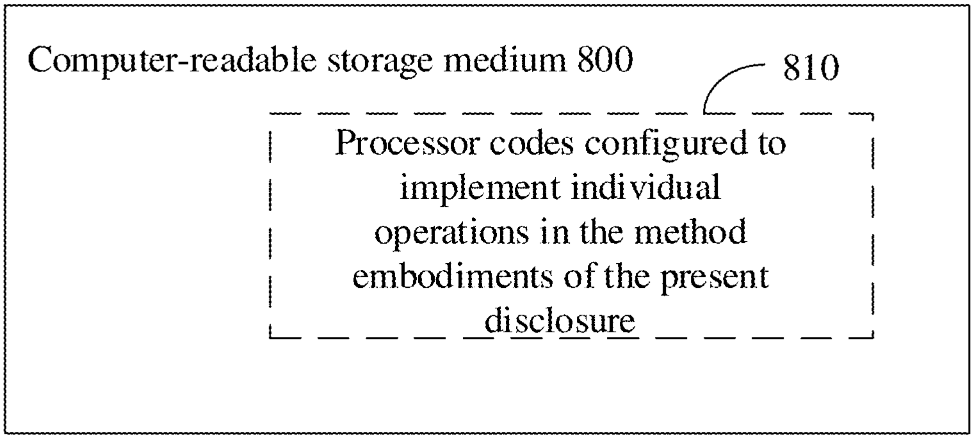
FIG. 21 is a schematic diagram illustrating a storage unit storing or carrying program codes to implement the screenshot method according to the embodiments of the present disclosure.

As illustrated in FIG. 21, a structural block diagram of a computer-readable storage medium according to an embodiment of the present disclosure is illustrated. The computer-readable medium 800 stores program codes therein, and the program codes may be invoked by a processor to perform the method described in the foregoing method embodiments.

The computer-readable storage medium 800 may be an electronic memory such as a flash memory, an electrically erasable programmable read-only memory (EEPROM), an EPROM, a hard disk, or a ROM. Optionally, the computer-readable storage medium 800 includes a non-transitory computer-readable storage medium. The computer-readable storage media 800 has a storage space for program codes 810 that implements any operations of the methods described above. These program codes may be read or written from one or more computer program products. The program codes 810 may, for example, be compressed in an appropriate form.

It is notable that the above embodiments are only used to describe the technical solutions of the present disclosure, rather than limiting such technical solutions. Although the present disclosure has been described in detail with reference to the foregoing embodiments, those skilled in the art will understand that they still can modify the technical solutions described in the foregoing embodiments, or equivalently substitute some of the technical features; however, such modifications or substitutions do not drive the essence of the corresponding technical solutions to depart from the spirit and scope of the technical solutions of the embodiments of present disclosure.

What is claimed is:

1. A screenshot method, comprising:

in response to a screenshot operation, acquiring separately a screenshot of each of multiple display windows displayed on a screen as a first screenshot, to obtain first screenshots of the multiple display windows, wherein the multiple display windows comprise at least three display windows;

acquiring at least one second screenshot each being a screenshot of at least two display windows of the multiple display windows, comprising:

obtaining multiple screenshot sets by arbitrarily combining the first screenshots of the at least three display windows to exhaust all possible combinations, wherein each of the screenshot sets comprises the first screenshots of at least two display windows; and splicing together all the first screenshots of each of the screenshot sets, thereby obtaining multiple spliced screenshots as second screenshots;

displaying the first screenshots and the second screenshots in a preview mode; and in response to a selection operation for a target screenshot of the screenshots displayed in the preview mode, saving the target screenshot.

2. The method of claim 1, wherein acquiring separately the screenshot of each of the multiple display windows displayed on the screen as the first screenshot, comprises:

capturing a whole content currently displayed on the screen, to obtain a full-screen screenshot; and cropping the full-screen screenshot according to the individual display windows, to obtain the screenshot of each of the display windows as the first screenshot.

3. The method of claim 2, wherein cropping the full-screen screenshot according to the individual display windows to obtain the screenshot of each of the display windows as the first screenshot, comprises:

in response to the multiple display windows comprising at least one floating window and at least one bottom window, determining an obscured area of each of the at least one bottom window obscured by the at least one floating window;

determining a first image of the obscured area of the bottom window and a second image of an unobscured area of the bottom window; and determining the first screenshot of the bottom window, based on the first image and the second image.

4. The method of claim 1, wherein splicing together all the first screenshots of each of the screenshot sets comprises:

stitching together all the first screenshots of each of the screenshot sets, based on an original window layout of the multiple display windows; or stitching together all the first screenshots of each of the screenshot sets in such a manner that all the first screenshots of each of the screenshot sets are arranged in a left-right direction or an up-to-down direction.

5. The method of claim 1, wherein displaying the first screenshots and the second screenshots in the preview mode comprises:

displaying the first screenshots and the second screenshots in the preview mode on a preview display interface; or displaying the first screenshots and the second screenshots on a current interface in a floating window.

6. The method of claim 5, wherein the preview display interface comprises a thumbnail display area and a zoom-in display area, and displaying the first screenshots and the second screenshots in the preview mode on the preview display interface comprises:

determining thumbnails of the first screenshots and the second screenshots, and displaying the thumbnails in the thumbnail display area; and in response to a switching operation for a screenshot corresponding to a thumbnail selected from the displayed thumbnails, zooming in and displaying the first screenshot or the second screenshot corresponding to the switching operation in the zoom-in display area.

7. The method of claim 1, wherein displaying the first screenshots and the second screenshots in the preview mode comprises:

determining display priorities of the first screenshots and the second screenshots; and displaying the first screenshots and the second screenshots in the preview mode, in a descending order of the display priorities.

8. The method of claim 7, wherein determining the display priority of the second screenshots comprises:

in response to the second screenshots comprising a designated screenshot, determining a display priority of the designated screenshot as a highest priority, wherein the designated screenshot is a screenshot of all the multiple display windows.

9. The method of claim 7, wherein before acquiring the screenshot of each of the multiple display windows displayed on the screen as the first screenshot in response to the screenshot operation, the method further comprises:

determining that the screenshot operation is received, in response to detecting a preset touch operation performed on the screen; and determining the display priorities of the first screenshots and the second screenshots comprises:

in response to the preset touch operation being completely within a target display window displayed on the screen, determining a display priority of the first screenshot of the target display window as a highest priority;

or, in response to the preset touch operation being within at least two designated display windows displayed on the screen, determining a display priority of the second screenshot of the at least two designated display windows as a highest priority.

10. The method of claim 1, wherein displaying the first screenshots and the second screenshots in the preview mode comprises:

determining whether a screenshot editing operation is received within a preset duration; and in response to receiving the screenshot editing operation within the preset duration, responding to the screenshot editing operation, and displaying the first screenshots and the second screenshots in the preview mode.

11. The method of claim 10, wherein determining whether the screenshot editing operation is received within the preset duration comprises:

determining one to-be-previewed screenshot from the first screenshots and the second screenshots, and displaying the to-be-previewed screenshot; and determining whether the screenshot editing operation for the to-be-previewed screenshot is received within the preset duration.

12. The method of claim 11, further comprising:

saving the to-be-previewed screenshot, in response to no screenshot editing operation being received within the preset duration.

13. The method of claim 11, wherein determining the to-be-previewed screenshot from the first screenshots and the second screenshots comprises:

determining display priorities of the first screenshots and the second screenshots; and displaying, as the to-be-previewed screenshot, a screenshot having a highest priority among the display priorities of the first screenshots and the second screenshots.

14. The method of claim 10, wherein the second screenshots comprises a designated screenshot of all the multiple display windows, and the method further comprises:

saving the designated screenshot, in response to no screenshot editing operation being received within the preset duration.

15. An electronic device, comprising:

one or more processors;

a memory; and one or more application programs stored in the memory, wherein the one or more application programs, when being executed by the one or more processors, cause the one or more processor to:

in response to a screenshot operation, acquire separately first screenshots of multiple display windows displayed on a screen, each of the first screenshots being a screenshot of one of the multiple display windows;

acquire at least one second screenshot each being a screenshot of at least two display windows of the multiple display windows;

determine display priorities of the first screenshots and the at least one second screenshot;

display the first screenshots and the at least one second screenshot, in a descending order of the display priorities; and in response to a screenshot being selected from the displayed screenshots, save the selected screenshot;

wherein the screenshot operation is a preset touch operation, and the one or more application programs, when being executed by the one or more processors, further cause the one or more processor to:

when the screenshot operation is completely within a target display window displayed on the screen, determine a display priority of the first screenshot of the target display window as a highest priority;

when the screenshot operation is within at least two target display windows displayed on the screen, determine a display priority of a second screenshot of the at least two target display windows as a highest priority.

16. The electronic device of claim 15, wherein the multiple display windows comprise at least three display windows, and the one or more application programs, when being executed by the one or more processors, further cause the one or more processor to:

capture a whole content currently displayed on the screen, to obtain a full-screen screenshot;

crop the full-screen screenshot according to the individual display windows, to obtain the screenshot of each of the display windows as the first screenshot; and combine the first screenshots of the individual display windows arbitrarily with all possible combinations exhausted, to obtain multiple screenshot sets, wherein each of the screenshot sets comprises the first screenshots of at least two display windows; and splice together all the first screenshots of each of the screenshot sets, to obtain multiple spliced screenshots as second screenshots.

17. The electronic device of claim 15, wherein the one or more application programs, when being executed by the one or more processors, further cause the one or more processor to:

determine thumbnails of the first screenshots and the at least one second screenshot, and display the thumbnails in a thumbnail display area; and in response to a switching operation for a screenshot corresponding to a thumbnail selected from the displayed thumbnails, zoom in and display the first screenshot or the second screenshot corresponding to the switching operation in a zoom-in display area.

18. The electronic device of claim 15, wherein the one or more application programs, when being executed by the one or more processors, further cause the one or more processor to:

determine one to-be-previewed screenshot from the first screenshots and the at least one second screenshot, and display the to-be-previewed screenshot;

in response to receiving a screenshot editing operation for the to-be-previewed screenshot within a preset duration, respond to the screenshot editing operation, and display the first screenshots and the at least one second screenshot in the preview mode; and save the to-be-previewed screenshot, in response to no screenshot editing operation being received within the preset duration.

19. A non-transitory computer-readable storage medium, having program codes stored therein, and the program codes are executable by a processor to perform:

in response to a multi-finger sliding operation or a sliding operation along a preset trajectory, acquire acquiring separately first screenshots of multiple display windows displayed on a screen, each of the first screenshots being a screenshot of one of the multiple display windows, wherein the multiple display windows comprise at least three display windows;

acquire acquiring at least one second screenshot each being a screenshot of at least two display windows of the multiple display windows, comprising:

obtaining multiple screenshot sets by arbitrarily combining the first screenshots of the at least three display windows to exhaust all possible combinations, wherein each of the screenshot sets comprises the first screenshots of at least two display windows; and splicing together all the first screenshots of each of the screenshot sets, thereby obtaining multiple spliced screenshots as second screenshots;

determine determining one to-be-previewed screenshot from the first screenshots and the at least one second screenshots, and display displaying the to-be-previewed screenshot;

when a screenshot editing operation for the to-be-previewed screenshot is received within a preset duration, in response to the screenshot editing operation, display displaying the first screenshots and the at least one second screenshots; and in response to a selection operation for a target screenshot of the displayed first screenshots and the displayed at least one second screenshots, save saving the target screenshot; and when no screenshot editing operation is received within the preset duration, save saving the to-be-previewed screenshot.

* * * * *